United States Patent [19]
Hoell et al.

[11] Patent Number: 5,630,973
[45] Date of Patent: May 20, 1997

[54] PROCESS FOR PRODUCING SLIDING BODIES FOR ELECTRIC COLLECTORS

[75] Inventors: Johann Hoell, Hallstatt; Herbert Grabner, Bad Ischl, both of Austria

[73] Assignee: Hoffman & Co. Elektrokohle Ges. mbH, Steeg, Austria

[21] Appl. No.: 416,722

[22] PCT Filed: Oct. 12, 1993

[86] PCT No.: PCT/EP93/02803

§ 371 Date: Apr. 5, 1995

§ 102(e) Date: Apr. 5, 1995

[87] PCT Pub. No.: WO94/08771

PCT Pub. Date: Apr. 28, 1994

[30] Foreign Application Priority Data

Oct. 13, 1992 [DE] Germany ............ 42 34 497.2

[51] Int. Cl.⁶ .................................................. C04B 35/00
[52] U.S. Cl. ...................................... 264/105; 264/331.11
[58] Field of Search .............................. 264/105, 122, 264/331.11

[56] References Cited

U.S. PATENT DOCUMENTS

| | | | |
|---|---|---|---|
| 3,510,710 | 5/1970 | McCafferty | 310/249 |
| 4,055,615 | 10/1977 | IKeda | 264/105 |
| 4,359,438 | 11/1982 | Hoggins et al. | 264/105 |
| 4,822,538 | 4/1989 | Yoshida et al. | 264/29.4 |

OTHER PUBLICATIONS

Patent Abstracts of Japan, vol. 13, No. 142 (E–793) (3490) Apr. 7, 1989 & JP, A, 63 302 744 (Hitachi Chem Co. Ltd.) Dec. 9, 1988.

Patent Abstracts of Japan, vol. 16, No. 285 (E–1222) (5328) Jun. 24, 1992 & JP, 04 071 177 (Shin Etsu Polymer Co. Ltd.) Mar. 5, 1992.

Japanese Patents Gazette, Section Ch, Week 8630, Sep. 3, 1986, Derwent Publications Ltd., London, GB; Class L, P. 12, AN 86–192435/30 & JP, A, 61 124 080 (Hitachi Chemical K.K.) Jun. 11, 1986.

Primary Examiner—Christopher A. Fiorilla
Attorney, Agent, or Firm—Townsend and Townsend and Crew LLP

[57] ABSTRACT

A sliding body for electric collectors and the like is press-formed from a powder mass or composition which includes at least graphite and a synthetic resin as a bonding agent. The powder mass is pressed in a mold with at least one press die after a thin layer of a resin-free parting compound is applied between the powder mass and the press die to prevent the resin from adhering to the press die when subjected to frictional heat of compression. Powdered copper is the preferred parting compound and also reduces the contact resistance between the press-formed powder mass and a lead embedded in and pressed with the powder mass in the mold.

9 Claims, 1 Drawing Sheet

FIG 1
FIG 2
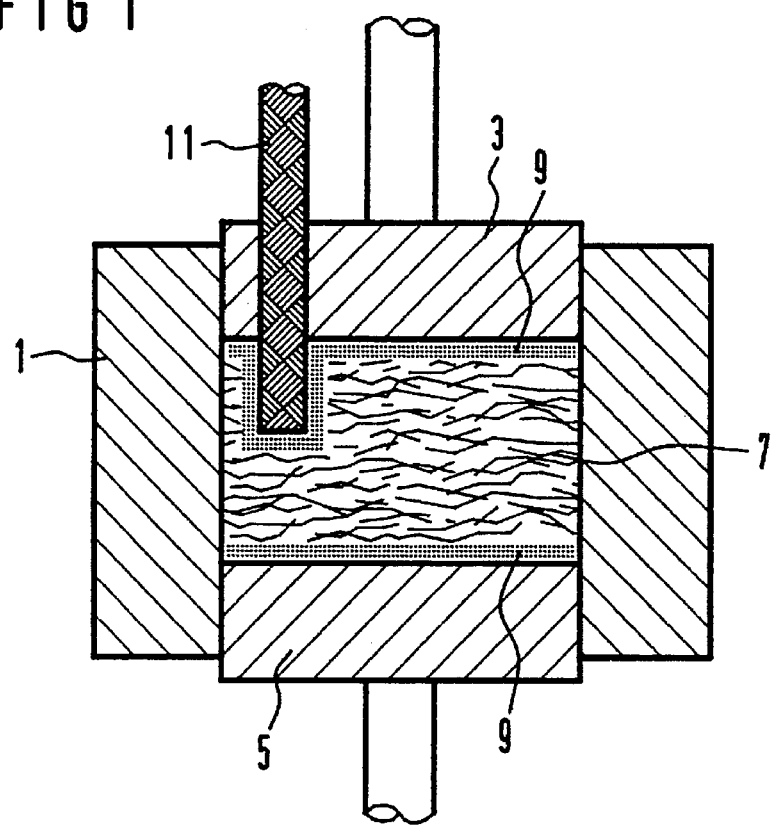
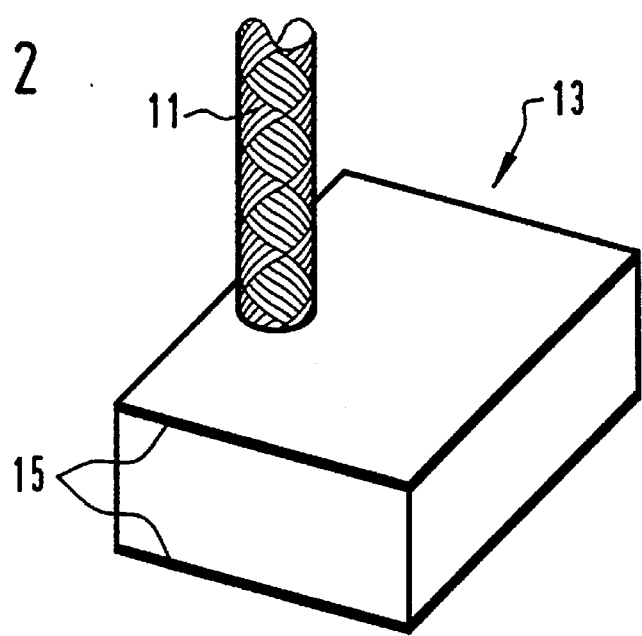

PROCESS FOR PRODUCING SLIDING BODIES FOR ELECTRIC COLLECTORS

BACKGROUND OF THE INVENTION

The invention relates to a method for producing sliding bodies for electric collectors, contact brushes, current collectors and the like. It involves placing a powder mass which includes at least graphite and one synthetic resin binder in a mold having at least one press die for pressing the powder into a shaped body. The body is thereafter heat treated by subjecting it to a sintering temperature at which the binder softens and binds the powder mass together.

When practicing such a method it has been noted that the press dies become quickly fouled and require cleaning after short time intervals to remove residues from the die. The reason for this is that during pressing heat is generated between the press die and the powder particles on which it acts which melts the resin binder in the vicinity of the press die. Thus, the binder adheres to the surface of the die, which in turn can cause other constituents of the powder mass to adhere to the die. A press die to which such residue clings cannot press-form bodies which have a clean surface. Press dies therefore require frequent cleaning.

SUMMARY OF THE INVENTION

It is an object of the invention to provide a method of the above-mentioned type which significantly lengthens the time intervals before the pressing tools must be cleaned while producing sliding bodies which have an improved surface quality.

In accordance with the present invention a method of the above-mentioned type is characterized in that a parting compound which is free of synthetic resin is placed between the powder mass in the mold and the press die. It has been discovered that an appropriately selected parting compound effectively completely eliminates the adhesion of residue on the press die. Consequently, the heretofore common, frequent cleaning of the press die can by and large be eliminated.

It is particularly advantageous to use a powder-like parting compound because it can be placed in the mold with equipment already available on the pressing machine for placing the powder mass that is to be pressed into the mold. The parting compound placed into the mold combines with the powder mass during pressing and forms a thin sheath over the surface of the press-formed body.

It is preferred to use a powder of an electrically conductive material as the parting compound. Thus, pure graphite, for example, can be used as a parting compound. It is particularly advantageous to use a material having a very high electric conductivity, such as copper, as the parting compound. When copper powder is applied as a parting compound layer and the required electric lead is extended through the compound layer into the powder mass in the mold, the lead is pressed with and into the powder mass. This has the additional advantage of a significant reduction in the electrical resistance between the sliding body and the lead pressed into it.

Alternative embodiments of the invention contemplate to use foil-like materials as the parting compound. The foil material is either removed from the formed body after completion of the pressing and before the former is heat treated, or it can remain on the body during heat treatment. In the latter case, care must be taken that the parting compound does not include substances which are released during the heat treatment, and can then enter the pressed body and, for example, change its porosity. It is also possible to use, for example, paper as the parting compound, which, during the heat treatment, incinerates substantially completely without leaving any residues.

An embodiment of the invention will be described with reference to the drawings.

BRIEF DESCRIPTION OF THE DRAWINGS

FIG. 1 schematically shows a section through a press mold during the fabrication of a sliding body in accordance with the invention.

FIG. 2 schematically shows a finished sliding body made according to FIG. 1.

DESCRIPTION OF THE PREFERRED EMBODIMENTS

According to FIG. 1 the press comprises a mold 1 and an upper and a lower press die 3, 5. In use a powder mass 7 is filled into the mold between press dies 3, 5. By applying a pressing force to press dies 3, 5 the powder is press-formed into a body. The base material for the powder mass 7 is graphite. It is mixed with a powdered synthetic resin, such as phenolic resin, as the binder. To enhance the conductivity of the sliding body, copper in powder form can be added to the powder mass. A typical mixture for powder mass 7 may, for example, include 40% copper, 14% phenolic resin, and graphite as a remainder.

A thin layer of a powder-like parting compound 9 is applied over the surface of the lower press die 5 before the powder mass 7 that is to be pressed is filled into the mold. A similarly thin layer 9 of the parting compound is applied to the surface of the powder mass 7 filled into the mold before the upper press die 3 is appropriately positioned. Parting compound 9 is preferably copper in powder form. During pressing, parting compound 9 prevents particles of the synthetic resin in the powder mass 7, which may become softened by friction-generated heat during pressing, from adhering to press dies 3, 5.

Upper press die 3 is preferably constructed so that it inserts the end of a lead 11 into the powder mass 7 when the upper press die 3 is placed in position on the mold so that the cable is press-formed with the powder mass. When lead 11 is inserted into the powder mass 7 it penetrates parting compound layer 9. In doing so, the lead carries particles of the parting compound with it, thereby forming a thin parting compound layer about the inserted end of lead 11.

After pressing the formed body is removed from the mold and subjected to heat treatment. This softens the synthetic resin binder in the pressed powder mass 7 and, like sintering, cements and solidifies the pressed powder mass into a finished sliding body. The temperatures for such a synthetic resin sintering process are typically in the range of between 400°–800° C.

FIG. 2 shows the finished sliding body 13. It has a very thin (for example, a few 1/100 mm) layer 15 of pure copper on its upper and lower surfaces, each resulting from the parting compound layer 9 in FIG. 1. The vertical side surfaces are formed by the press-formed, mixed graphite and copper powder material 7. As mentioned earlier, an end portion of lead 11 press-formed into sliding body 13 is also surrounded by a thin layer of the parting compound. This layer improves the surface contact between lead 11 and sliding body 13. Surprisingly, the contact resistance between lead 11 and sliding body 13 is reduced by more than half by the copper powder parting compound, even when lead 11 is made of pure copper.

As already mentioned and even though the preferred embodiments of the invention use copper powder as the parting compound, many other materials, both in powder form and as foils, can be used as the parting compound. All that is necessary is that the parting compound is free of synthetic resin or other substances which, during pressing, and especially due to frictionally generated heat, can adhere to the press die. Further, the parting compound may not include other substances which can undesirably affect the properties of the sliding bodies, such as their conductivity, porosity, etc. Any parting compound remaining on the finished product may not adversely affect the operating characteristics of the product, i.e., may not be incompatible with the base material of the sliding body.

What is claimed is:

1. A method for producing a compressed body of graphite material for use in electric collectors, contact brushes, or current collectors comprising the steps of placing a powder mass (7), which includes at least graphite and a synthetic resin binder, in a mold (1) having at least one press die (3); pressing said powder mass by means of the press die into a formed body; and subsequently heat treating said formed body by subjecting it to a sintering temperature at which the binder softens and binds the powder mass, the method further comprising the step of placing a parting layer (9) which is free of synthetic resin between the powder mass and the press die (3, 5) prior to said step of pressing, said parting layer (9) being formed of a powder made from a material which does not change when subjected to the sintering temperature.

2. Method according to claim 1 wherein the parting layer is formed of a powder of an electrically conductive material.

3. Method according to claim 2 wherein the parting layer is formed of copper powder or graphite powder or a mixture of both.

4. Method according to claim 1 including inserting an electric lead (11) through the parting layer (9) into the powder mass (7) after the parting layer (9) has been formed, and pressing the lead with the powder mass.

5. Method for making a sliding body for electric contacts comprising the steps of providing a mold having a cavity and at least one press die movable into the cavity and having a surface facing the cavity; placing a powder mass including at least graphite and a heat responsive binder into the cavity; forming a parting layer between the powder mass in the cavity and the surface of the press die, the parting layer consisting essentially of a powder made from material which does not adhere to the press die surface when subjected to temperatures and pressures encountered during press-forming; and forcing the press die into the cavity so that the surface of the press die contacts the parting layer and press-forms the powder mass into a formed body.

6. Method according to claim 5 wherein the step of forming said parting layer comprises applying a layer of a powdered metal between the surface of the die and the powder mass in the cavity.

7. Method according to claim 5 wherein the step of applying said parting layer is performed prior to the step of placing the powder mass in the cavity.

8. Method according to claim 5 wherein the step of applying said parting layer is performed after the step of placing the powder mass in the cavity.

9. A method for producing a body for electric collectors, contact brushes, or current collectors comprising pressing a powder mass which includes at least graphite and a synthetic resin binder in a mold with at least one press die into a formed body, subsequently heat treating the formed body by subjecting it to a sintering temperature at which the binder softens and binds the powder mass, and placing a layer of foil material which is free of synthetic resin between the powder mass and the press die.

* * * * *